United States Patent [19] 3,682,071
Hosoe [45] Aug. 8, 1972

[54] AUTOMATIC FOCUSING DEVICE FOR CAMERAS

[72] Inventor: Kazuya Hosoe, Kawasaki, Japan
[73] Assignee: Canon Kabushiki Kaisha, Tokyo, Japan
[22] Filed: Nov. 5, 1970
[21] Appl. No.: 87,237

[30] Foreign Application Priority Data

Nov. 15, 1969   Japan ..................... 44/91112

[52] U.S. Cl. .................. 95/44 C, 250/208, 250/210, 356/4
[51] Int. Cl. .......................... G03b 3/00, G01c 3/08
[58] Field of Search ....... 95/44 C; 250/208, 209, 210; 356/5, 6

[56] References Cited

UNITED STATES PATENTS

| | | | |
|---|---|---|---|
| 3,333,105 | 7/1967 | Kossakowski | 356/4 X |
| 3,443,502 | 5/1969 | Harvey | 95/44 C |
| 3,511,155 | 5/1970 | Yamada | 356/4 X |
| 3,512,888 | 5/1970 | Humphrey | 250/221 X |
| 3,600,099 | 8/1971 | Schoeffel | 205/209 X |
| 3,529,528 | 9/1970 | Leitz | 95/44 C |
| 3,029,348 | 4/1962 | Heinz | 250/210 X |
| 3,035,176 | 5/1962 | Kis | 250/210 |
| 3,127,463 | 3/1964 | Papke | 95/44 C X |
| 3,130,305 | 4/1964 | Sutherland | 250/208 X |
| 3,315,153 | 4/1967 | Whatley | 250/210 X |
| 3,445,665 | 5/1969 | Laughman | 250/208 |
| 3,578,975 | 5/1971 | Wheeler | 250/208 X |

Primary Examiner—Samuel S. Matthews
Assistant Examiner—Michael Harris
Attorney—Watson, Leavenworth & Kelton

[57] ABSTRACT

An automatic focusing device for cameras projects from the camera to an object to be photographed a spot of light whose intensity is modulated. The light reflected by the object is received by a range-finding lens and this received light is divided to form two images on two photoelectric effect elements, respectively, through an optical system which produces the two images with an apparent parallax except when the object is sharply in focus. The range-finding lens is movable with the phototaking lens and is shifted back and forth by the signal output from the photoelectric effect elements which signal varies depending upon whether or not the images on both photoelectric effect elements are free from apparent parallax.

10 Claims, 7 Drawing Figures

AUTOMATIC FOCUSING DEVICE FOR CAMERAS

BACKGROUND OF THE INVENTION

The present invention relates to an automatic focusing device for cameras.

The most important problem encountered in various automatic focusing systems of the prior art is that precise focusing of an object at a desired position depends upon the nature of the object. Hence, the object generally is out of focus at the film plane.

The present invention was made to overcome this problem and provides an improved automatic focusing device for cameras which is capable of focusing with a greater degree of accuracy.

SUMMARY OF THE INVENTION

In brief, the present invention is characterized in that a spot of light whose intensity is modulated is projected onto an object from a light source fixed to the camera; the light from the spot which is reflected by the object is received through a range-finder lens; the light emerging from the range-finder lens is split into two light beams so that two images are formed upon two photoelectric effect elements through an optical system which produces two images having apparent parallax except when the object is sharply focused; and the lens is shifted in response to the signals which vary depending upon the difference or coincidence of said two images upon said two photoelectric effect elements to thereby focus the object.

DESCRIPTION OF THE PREFERRED EMBODIMENTS

Figure 1:
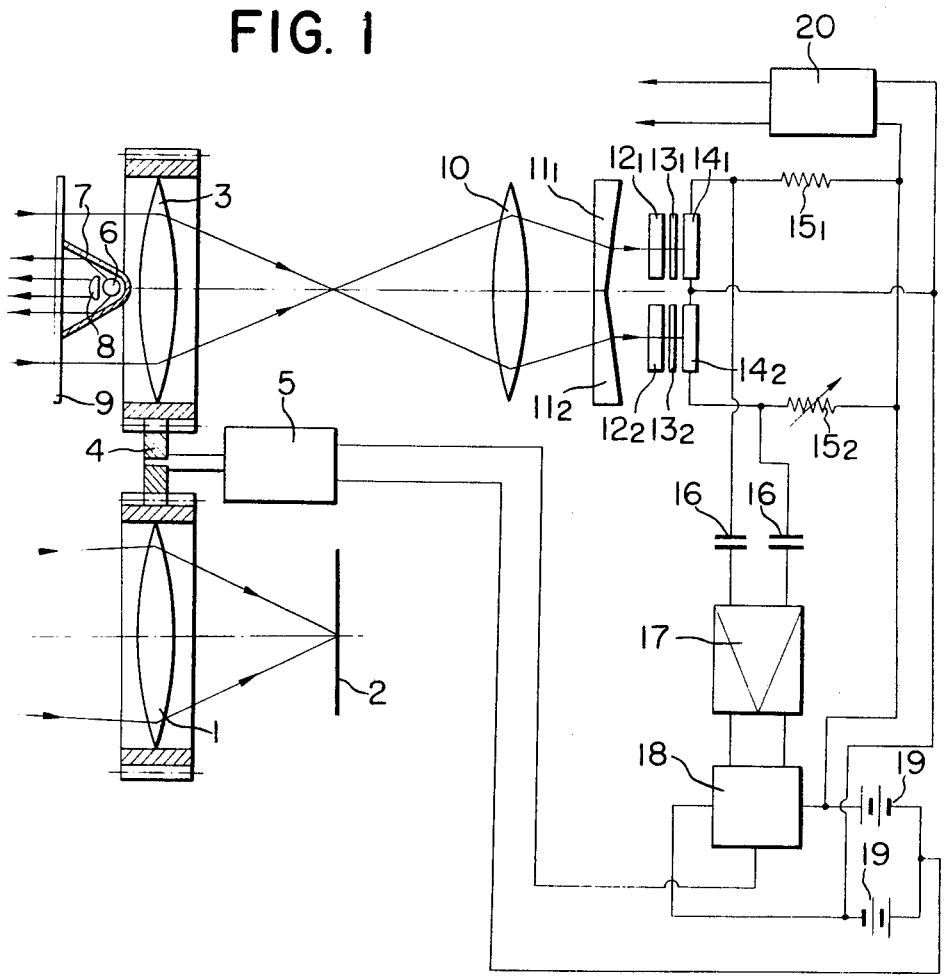
FIG. 1 is a schematic side view of one embodiment of the present invention illustrating only the major components.

Referring to FIG. 1, reference numeral 1 designates a picture taking lens; 2 is the film plane; 3 is a range-finder lens which is shifted forward or back in unison with the picture taking lens through an interlocking mechanism 4; numeral 5 designates an electric motor for moving or shifting the lenses 1 and 3; numeral 6 designates a lamp disposed forwardly of the range-finder lens 3; numeral 7 designates a reflector; and 8 is a condenser lens. The lamp 6 may be an incandescent lamp, but it is most preferable to employ an infrared lamp, whose output intensity is modulated at a predetermined frequency and whose thus modulated parallel or collimated light beam is adapted to illuminate an object. Reference numeral 9 designates an infrared ray filter used for projecting the infrared rays; 10 is a relay lens for the range-finding lens; numerals $11_1$ and $11_2$ designate two prisms for splitting into two light beams the light beam passing through the lenses 3 and 10; numerals $12_1$ and $12_2$ designate cylindrical lenses disposed in the proximity of the focal point of the relay lens 10 for enlarging the images to be formed by the two light beams only in a predetermined direction to attain normalization; numerals $13_1$ and $13_2$ designate masks for defining the fields of view (stops for defining the exit pupils); and $14_1$ and $14_2$ are photoelectric effect elements disposed symmetrically about the optical axis of the range-finder lens 3.

A detecting circuit coupled to these photoelectric effect elements $14_1$ and $14_2$ for comparing the outputs therefrom includes: resistors $15_1$ and $15_2$, one of which is a variable resistor while the other is a resistor for adjustment of the balance of the circuit; a capacitor 16 for eliminating naturally occurring low frequency noise components; and a differential amplifier 17 for amplifying the signals while eliminating periodically varying noise, the differential amplifier being provided with a filter for passing only signals with a specified frequency. Numeral 18 designates a switch for reversing the rotation of the motor 5, while 19 is an electric power source and 20 is a vibrator for applying pulses to the lamp 6 so that the light emitted therefrom is modulated.

The light beam from the lamp 6 has a sufficient directivity through the reflector 7 and the condenser lens 8 to spot-illuminate the object. The light reflected by the object passes through the range-finder lens 3. Since the lamp 6 is modulated at a rate of 10 – 30 Hz by the vibrator 20, the light emitted from the lamp 6 can be easily distinguished from natural light. This is done more efficiently with the use of infrared rays. The pencil of light passing through the range-finder lens 3 is in general focused as a circular spot which is further enlarged or magnified by the relay lens 10 and is divided or split into two light beams by the prisms $11_1$ and $11_2$. Thus, real images are formed upon the photoelectric effect elements $14_1$ and $14_2$ through the cylindrical lenses $12_1$ and $12_2$ and the masks $13_1$ and $13_2$, respectively.

Figure 2A:
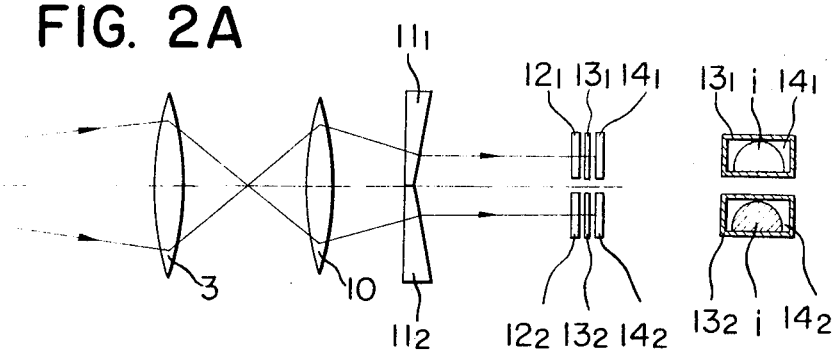
FIGS. 2A, 2B and 2C are views for explanation of the relations between the images formed by the range-finder optical system in the case of a subject being precisely focused, forward-focused and backward-focused.
Figure 2B:
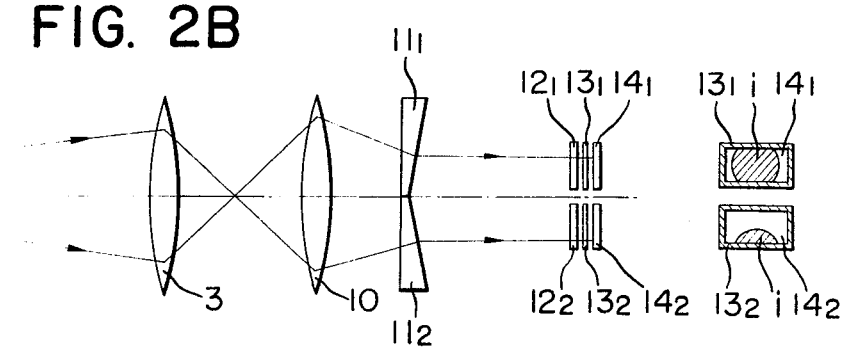
Figure 2C:
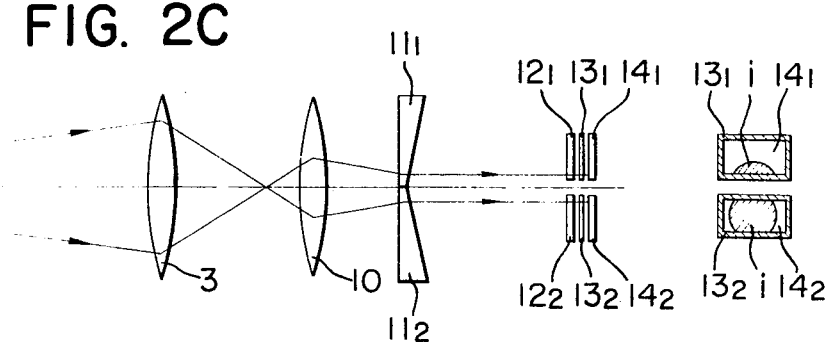
Figure 3:
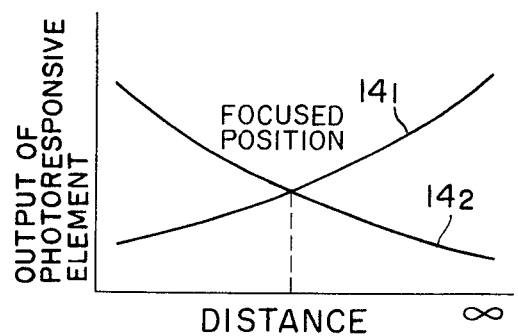
FIG. 3 is a graph illustrating the outputs from two photoelectric elements.

FIG. 2A illustrates images $i$ which are sharply focused; FIG. 2B shows images forward-focused; and FIG. 2C shows images backward-focused. When the object is sharply focused, the images $i$ upon both of the photoelectric effect elements $14_1$ and $14_2$ are symmetrical and have the same area. However, in the case of forward-focus as illustrated in FIG. 2B, the principal light rays of the split light beams are spaced farther apart from each other so that the configurations and areas of the two images are different from each other. In the case of backward-focus as illustrated in FIG. 2C, the spacing between the two principal light rays is reduced so that images $i$ opposite to those in FIG. 2B are obtained. In other words, there is a difference in the signal outputs from the photoelectric effect elements in the cases of forward- and backward-focus. When the range-finding lens 3 is shifted from its position for focusing an object closest to the lens 3 to its position for infinity, the outputs of the photoelectric effect elements $14_1$ and $14_2$ are varied as shown by the curves in FIG. 3. These curves are symmetrical about the normal passing through their intersection. The outputs from the photoelectric effect elements $14_1$ and $14_2$ are compared by a bridge circuit consisting of resistors $15_1$ and $15_2$, and the output from the bridge circuit is applied to the differential amplifier 17 whose output is then fed to the switching circuit 18 to thereby control the direction of rotation of the motor 5 for positioning the picture taking and range-finding lenses 1 and 3 at the focusing position.

Figure 4:
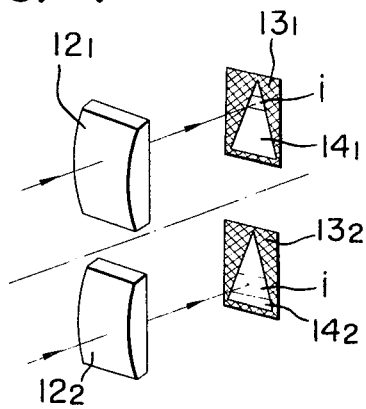
FIG. 4 is a perspective view illustrating a variation of a mask used in the present invention.
Figure 5:
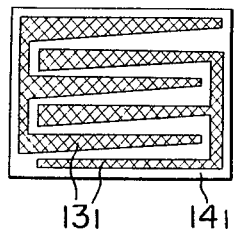
FIG. 5 is a plan view illustrating one example of a photoelectric effect element having specially arranged electrodes.

As described hereinbefore, the spot light whose intensity is modulated is directed from the camera to the object and the light reflected by the object is split into two light beams so as to be focused upon the two photoelectric effect elements. Therefore, whether the object is sharply focused or not will be detected by the displacement of the images focused upon the elements, the displacement in turn being dependent upon whether the object is sharply focused or not. In this case, however, when the dimensions of the images are too small, no output will be obtained from the photoelectric effect elements because of their construction and arrangement of electrodes. Therefore, cylindrical lenses are employed in order to magnify the images in the direction of their shift and in the direction normal thereto so that the electric conduction of these photoelectric effect elements will be ensured. This will be further ensured when the masks $13_1$ and $13_2$ with apertures as shown in FIG. 4 are employed to respond to the shift of the images. Thus, the variation of the outputs from the photoelectric effect elements can be further increased. It is not necessary to space the masks $13_1$ and $13_2$ away from the photoelectric effect elements, and, if necessary, the effect of the provision of the masks may be attained by depositing in vacuum upon the photoelectric effect elements an opaque substance. Alternatively, the arrangement of the electrodes may be suitably selected so that they serve as the masks. This is illustrated in FIG. 5 in which electrodes which function also as the mask are designated by $13_1$. When this type of photoelectric effect element is employed, the cylindrical lenses may be eliminated.

The automatic focusing device for cameras in accordance with the present invention can accurately focus an object upon a desired position irrespective of the conditions of the object. In addition, the accuracy in focusing will be improved greatly.

What is claimed is:

1. An automatic focusing system for cameras comprising in combination means for projecting from a camera to an object a spot of light whose intensity is modulated, an adjustable focus lens for producing at said camera an image of said spot of light as reflected from said object, two photoelectric effect elements, means for splitting said image into two images and directing said two images onto corresponding ones of said two photoelectric effect elements with said two images having apparent parallax except when said object is sharply in focus, and means responsive to output signals from said photoelectric effect elements departing from a given relationship for adjusting the focus of said lens until said object is sharply in focus.

2. An automatic focusing system according to claim 1, wherein said camera has a separate picture taking lens interconnected with said adjustable focus lens for conjoint focusing adjustment.

3. An automatic focusing system according to claim 2, wherein said means for splitting said image into two images comprises an image magnifying relay lens and image splitting prisms disposed in the order mentioned behind said adjustable focus lens.

4. An automatic focusing system according to claim 1, wherein said means for splitting said image into two images comprises an image magnifying relay lens and image splitting prisms disposed in the order mentioned behind said adjustable focus lens.

5. An automatic focusing system according to claim 4, wherein said means for splitting said image into two images further comprises a corresponding cylindrical lens and mask for defining the field of view interposed between said prisms and each of said photoelectric effect elements.

6. An automatic focusing system according to claim 5, wherein said camera has a separate picture taking lens interconnected with said adjustable focus lens for conjoint focusing adjustment.

7. An automatic focusing system according to claim 1, wherein means are provided for modulating said spot of light at a given frequency, and said means responsive to output signals from said photoelectric effect elements comprises filter means for passing signals only of said given frequency.

8. An automatic focusing system according to claim 7, wherein said means for splitting said image into two images comprises an image magnifying relay lens and image splitting prisms disposed in the order mentioned behind said adjustable focus lens.

9. An automatic focusing system according to claim 8, wherein said means for splitting said image into two images further comprises a corresponding cylindrical lens and mask for defining the field of view interposed between said prisms and each of said photoelectric effect elements.

10. An automatic focusing system according to claim 9, wherein said camera has a separate picture taking lens interconnected with said adjustable focus lens for conjoint focusing adjustment.

* * * * *